(12) United States Patent
Kim (10) Patent No.: US 9,878,348 B2
(45) Date of Patent: Jan. 30, 2018

(54) COATING COMPOSITION WITH IMPROVED SENSE OF SPARKLE AND COATING METHOD USING COATING COMPOSITION

(71) Applicant: Hyundai Motor Company, Seoul (KR)

(72) Inventor: Sang G. Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 544 days.

(21) Appl. No.: 14/530,340

(22) Filed: Oct. 31, 2014

(65) Prior Publication Data

US 2015/0175831 A1    Jun. 25, 2015

(30) Foreign Application Priority Data

Dec. 19, 2013  (KR) .................. 10-2013-0159506

(51) Int. Cl.
| | | |
|---|---|---|
| *C09D 5/22* | (2006.01) | |
| *B05D 7/00* | (2006.01) | |
| *C09D 133/06* | (2006.01) | |
| *C09D 133/08* | (2006.01) | |

(52) U.S. Cl.
CPC .................. *B05D 7/52* (2013.01); *B05D 7/54* (2013.01); *C09D 133/06* (2013.01); *B05D 2502/00* (2013.01); *B05D 2601/08* (2013.01); *C09D 5/22* (2013.01); *C09D 133/08* (2013.01); *Y10T 428/256* (2015.01); *Y10T 428/31511* (2015.04)

(58) Field of Classification Search
CPC ... B05D 7/52; B05D 7/54; C09D 5/22; C09D 133/08
See application file for complete search history.

(56) References Cited

U.S. PATENT DOCUMENTS

| | | | | |
|---|---|---|---|---|
| 6,096,378 A * | 8/2000 | Komatsu | ................ | B05D 5/066 427/407.1 |
| 6,335,057 B1 * | 1/2002 | Noura | .................... | B05D 5/068 427/380 |
| 2003/0175436 A1 * | 9/2003 | Honda | ..................... | B05D 7/53 427/385.5 |
| 2006/0286303 A1 * | 12/2006 | Avgenaki | ............... | B05D 5/068 427/372.2 |
| 2009/0136729 A1 * | 5/2009 | Tonomura | ................ | B05D 5/06 428/218 |
| 2009/0162696 A1 * | 6/2009 | Kitamura | ............... | B05D 5/068 428/701 |
| 2010/0143705 A1 * | 6/2010 | Chilla | ..................... | B05D 7/14 428/328 |
| 2011/0070450 A1 * | 3/2011 | Hazan | ..................... | B05D 7/14 428/423.1 |
| 2014/0308495 A1 * | 10/2014 | December | ............. | B05D 5/068 428/216 |
| 2015/0004401 A1 * | 1/2015 | Kojima | ................ | C09D 175/04 428/334 |
| 2017/0001217 A1 * | 1/2017 | Fujiwara | .................. | C09D 9/00 |

FOREIGN PATENT DOCUMENTS

| | | |
|---|---|---|
| JP | 10-088026 A | 4/1998 |
| JP | 10-272901 | 10/1998 |
| JP | 2005-042112 A | 2/2005 |
| JP | 2007-217548 A | 8/2007 |
| KR | 10-2000-0027859 | 5/2000 |
| KR | 10-2004-0063633 | 7/2004 |
| KR | 10-2008-0008520 A | 1/2008 |
| KR | 10-2009-0122195 | 11/2009 |
| KR | 10-2012-0049479 | 5/2012 |
| WO | 2006-012187 A1 | 2/2006 |
| WO | 2006/062666 A1 | 6/2006 |
| WO | 2006/110359 A2 | 10/2006 |
| WO | 2011-095447 A2 | 8/2011 |

\* cited by examiner

*Primary Examiner* — Margaret Moore
(74) *Attorney, Agent, or Firm* — Mintz Levin Cohn Ferris Glovsky and Popeo, P.C.; Peter F. Corless (57) ABSTRACT

A double-layer coating composition having improved sparkling effect, and a method of coating the same are provided. The composition includes a first coating, which reinforces the sparkling effect and contains a greater amount of Al particle; and a second coating, which reinforces chromaticity and contains a less amount of Al particle. The method includes applying a first coating on an article and applying a second coating thereon.

11 Claims, 3 Drawing Sheets

FIG. 2B (Degree of blackness and dispersivity of pigment in coating depending on particle size)

COATING COMPOSITION WITH IMPROVED SENSE OF SPARKLE AND COATING METHOD USING COATING COMPOSITION

CROSS-REFERENCE TO RELATED APPLICATION

This application claims under 35 U.S.C. § 119(a) the benefit of Korean Patent Application No. 10-2013-0159506 filed Dec. 19, 2013, the entire contents of which are incorporated herein by reference.

TECHNICAL FIELD

The present disclosure relates to a coating composition having an improved sparkling effect and a method of coating to improve sparkling effect. In particular, the present relates to a double-layer coating composition, which may provide an improved sparkling effect. The double-layer coating composition may include a first coating, which may reinforce the sparkling effect and contain greater amount of aluminum (Al) particle; and a second coating, which may reinforce the chromaticity and contain less amount of Al particle. The present invention further provides a method of double-layer coating, in which the first coating may be applied as a primary base coat and then the second coating is applied thereon. Therefore, the double-layer coating according to exemplary embodiments of present invention may have improved sparkling effect and chromaticity; and further provide an improved three dimensional effect.

BACKGROUND

Various structural parts, which may be formed of metal or plastic, are generally coated prior to use to protect structures from the external environment or damages, to prevent structures from corrosion, to enhance the durability of vehicle parts, and to enhance the exterior appearance thereof.

In addition to a role of coating of protecting from corrosion caused by the external environment, implementing color and esthetic effects by coatings have become more significant factors in the manufacturing process of metal structures or a motor vehicle, particularly to enhance the exterior or appearance. Therefore, to impart esthetic and luxurious appearance to the surface of a metallic structure, some efforts by adding pearls or metal component particles to the coating composition have been conducted.

Furthermore, due to recent development in the various electrical or electronic products and the vehicle industry, a coating technique has been considered significantly together with other functional, convenient or safety features of such products. In addition, the coating may be determined by customer preference, and the coating technique also may be required to regenerate a similar color or effect of the prior coating when recoating is performed for repairing the surface.

There have been simple coating compositions for implementing colors to the surface of home appliance or motor vehicle. In addition, the coating compositions to which a pearl exhibiting diffused reflection effect with metal particles is mixed, thereby generating diverse colors or esthetic effect have been developed and commercialized.

In some related art, a coating composition for coating the surface of a metal containing about 4 to 20 wt % of aluminum pieces and a method of coating the composition, in which the composition containing aluminum pieces is coated two times, have been developed. In addition, another example of coating composition which may contain a hydrophilic treated metal powder (aluminum metal powder) exhibiting a diffused reflection effect at about 0.05 to 10 wt % with respect to 100 wt % of the total coating composition has been developed. In another example, a technique to form a sparkling cutting film containing a pigment composition with aluminum pigment on the surface of an article has been developed. Moreover, a technique, for coating a motor vehicle has been reported. In such case, coating as a translucent metal oxide film, and an effect pigment, in which the distribution of particle size is adjusted to have about 9.5 μm of D10, about 20 to less than 40 μm of D50, and about 45 to less than 85 μm of D90, may implement pearl gray.

Meanwhile, in the above-described techniques, a metal component, for example, aluminum, may be contained in a coating and sparkling effect may be applied by diffused reflection produced by the metal component, such as aluminum. However, sparkling effect produced by the metal component may not be favorable, and luxurious feel with a three dimensional effect may not be obtained.

In other examples, a solvent coating composition including multilayers of an under coat layer, a metal coat layer, an over coat layer, and the like, and a manufacturing method thereof have been reported. Such coating composition may include multilayers, and improved coating property and coating durability may be improved. However, the coating may be difficult to apply and inefficient due to complicated coating procedure or materials for multi-layers, and further may cause difficulties to reproduce the same coating or effects.

As described above, since coating compositions of the conventional techniques may have limitation in producing sparkling effect or a luxurious appearance, a further improvement in coating composition is strongly desired to meet various customer needs and improve product competitiveness.

The above information disclosed in this Background section is merely for enhancement of understanding of the background of the invention and therefore it may contain information that does not form the prior art that is already known in this country to a person of ordinary skill in the art.

SUMMARY

The present invention may provide a technical solution to solve the above problems associated with conventional techniques. In particular, according to the present invention, sparkling effect, chromaticity, and three dimensional effect of coating may be improved by double-layer coating composition and a coating method using the same. The double-layer coating composition according to one exemplary embodiment of the present invention may contain aluminum particles dispersed in two different coating layers in specific ranges which are different from each other.

In one aspect, the present invention provides a double-layer coating composition which may improve chromaticity and sparkling effect simultaneously, and further enhance the three dimensional effect.

In another aspect, the present invention provides a method of double-layer coating using the coating composition above, thereby improving chromaticity and sparkling effect simultaneously, and further enhancing the three dimensional effect.

In an exemplary embodiment, the present invention provides a coating composition, which may include: a first coating containing about 45 to 65 wt % of acrylic resin, about 15 to 30 wt % of acid epoxy resin adduct of acrylsiloxane resin, about 1 to 5 wt % of a color pigment, about 0.1 to 1 wt % of aluminum (Al) particle, about 10 to 20 wt % of at least one additive selected from a surface modifier, a UV absorber, a pinhole preventive, a reaction inhibitor, and an anti-sagging agent, and about 2 to 10 wt % of a solvent; and a second coating containing about 45 to 65 wt % of acrylic resin, about 15 to 30 wt % of acid epoxy resin adduct of acrylsiloxane resin, about 1 to 5 wt % of a color pigment for coating the same color as the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent.

In another exemplary embodiment, the present invention provides a method of applying the double-layer coating, which may comprise a primary base coating with the first coating composition containing about 45 to 65 wt % of acrylic resin, about 15 to 30 wt % of acid epoxy resin adduct of acrylsiloxane resin, about 1 to 5 wt % of a color pigment for coating, about 0.1 to 1 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent; and a second coating with the second coating composition containing about 45 to 65 wt % of acrylic resin, about 15 to 30 wt % of acid epoxy resin adduct of acrylsiloxane resin, about 1 to 5 wt % of a color pigment for coating the same color as the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent.

In an exemplary embodiment, the double-layer coating composition including the first coating and the second coating may contain different amount of Al particles in each coating composition to provide a sparkling effect and chromaticity, simultaneously, in contrast to using a pearl pigment as known in conventional techniques or using a coating composition of consistent content of metal particles, such as Al.

In an exemplary embodiment of the present invention, in the method of double-layer coating, the primary base coating may be applied and subsequently the second coating may be applied thereon. Therefore, in addition to improved chromaticity or color impression, a luxurious exterior appearance may be achieved by three dimensional effect and a sense of depth.

In another aspect, the present invention provides a high quality coating for the use to metalwares for home appliances, motor vehicles, or the like.

BRIEF DESCRIPTION OF THE DRAWINGS

The above and other features of the present invention will now be described in detail with reference to various exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one exemplary embodiment, the present invention provides a double layer coating composition which may include a first coating, which may reinforce sparkling effect and contain greater amount of Al particle; and a second coating, which may reinforce chromaticity and contain less amount of Al particle, in comparison to the conventional coatings containing metal particles.

In one exemplary embodiment, the first coating may contain about 45 to 65 wt % of acrylic resin, about 15 to 30 wt % of acid epoxy resin adduct of acrylsiloxane resin, about 1 to 5 wt % of a color pigment, about 0.1 to 1 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent.

The resin component may be an acrylic resin for coating. The acrylic resin may be a main component determining primary physicochemical properties of coating, for example, acid resistance. In addition, the acrylic resin may be included at about 45 to 65 wt %, at about 50 to 60 wt %, or at about 53 to 58 wt %. Primary physical properties, such as acid resistance, of the coating may deteriorate when the content of the acrylic resin is too low (e.g., below a predetermined level). In contrast, when the content of acrylic resin is too high (e.g., greater than a predetermined level), workability the coating may deteriorate.

In an exemplary embodiment, a resin component may be mixed with an acid epoxy resin adduct of acrylsiloxane to impart functionality to the coating composition based on acrylic resin. The acid epoxy resin adduct of acrylic resin may be obtained by adding an acid epoxy resin to 100 parts by weight of acrylsiloxane resin at about 40 to 55 parts by weight and partially polymerizing them. In another exemplary embodiment, the acid epoxy resin adduct of acrylic resin may be used at about 10 to 30 wt %, at about 18 to 25 wt %, or at about 20 to 22 wt % based on the total coating composition, thereby curing and improving physical properties. The hardness of coating film may decrease due to lack of reactivity when the content of the resin is too low; and sanding workability to finish the exterior appearance may deteriorate when the content thereof is too high.

The coating composition according to an exemplary embodiment of the present invention may contain a color pigment and Al particles to impart sparkling effect. The color pigment may be added to impart an impression of color or chromaticity. In an exemplary embodiment, the pigment may be mixed to the coating and then dispersed by a stirring method to substantially uniformly disperse the color pigment in the coating composition. In other exemplary embodiment, the color pigment particles may be atomized to a size of about 15 to 30 μm and be dispersed substantially uniformly and internally to maintain the color. The color sensitivity or chromaticity of the coating may be further improved when such a pigment is atomized in size and the dispersibility thereof in the coating is improved. In particular, the color pigment may be, but not limited to, a carbon pigment, perylene, a black pigment, or the like. The carbon pigment may impart the degree of blackness to the coating composition. In another exemplary embodiment, the color pigment may be used at about 1 to 5 wt %, or at about 2.0 to 2.5 wt % based on the total coating composition. The content of the color pigment may be determined based on the degree of color implementation. When the content of the color pigment is too low (e.g., below a predetermined level), sufficient chromaticity may not be obtained; and when the content is too high (e.g., greater than a predetermined level), sparkling effect obtained from the Al particles in the coating composition may not be properly contributed.

The Al particles may be used to impart sparkling effect of the coating. In an exemplary embodiment, in the first coating composition, the amount of Al particles may be about 0.1 to 1 wt %, about 0.2 to 0.5 wt %, or particularly about 0.3 to 0.4 wt % based on the total first coating composition. The content of Al particles in the first coating may determine the content of Al particles in the second coating composition. The sparkling effect may not be sufficient when the content of Al particles is less than about 0.1 wt %. Meanwhile, the implementation of chromaticity may be reduced due to increase in light scattering and luxurious appearance may be reduced when the content of Al particles is greater than about 1 wt %. In addition, Al particles may have a plate shape, and have a size of about 15 to 25 μm in longer axis. The pigment having flatness of color may be used in consideration of the physical properties, the use of coating and the improvement in sparkling effect.

The first coating may form a coating film layer contributing to the improvement sparkling effect since the content of Al particles in the first coating may be greater than the content thereof in the second coating. Thus, Al particles may be used instead of a pearl pigment, which has been used typically in conventional coating. In an exemplary embodiment of the present invention, Al particles may be prominently used, but a minimal amount of pearl pigment may be used in addition to the Al particles to enhance the sparkling effect. In particular, the pearl pigment may be additionally used, for example, at about 0.001 to 0.01 wt % based on the coating composition.

A typically used additive or solvent may be used in the coating composition of an exemplary embodiment of the present invention. The additive as used herein may contain, without limitation, one or more selected from a surface modifier, an ultraviolet (UV) absorber, a pinhole preventive, a reaction inhibitor, and an anti-sagging agent and may be used particularly at about 10 to 20 wt % based on the coating composition. Moreover, other additives may be additionally used in a minimal amount to provide other functionality to the coating composition. The physical or chemical properties of coating, such as acid resistance or esthetic effect may deteriorate when the additive is used substantially.

The surface modifier may be used as an additive at about 1 to 5 wt %, or particularly at about 2 to 3 wt % to improve smoothness. However, sand mark resistant property may deteriorate when the amount of the surface modifier is used excessively (e.g., more than a predetermined amount). In particular, a silicone modified acrylic resin may be used as a surface modifier. The ultraviolet absorber may be used at about 2 to 7 wt %, or particularly at about 4 to 5 wt % to prevent the coating surface damage due to UV irradiation and to maintain glossy surface. The quality of exterior appearance or luxurious appearance may be reduced when the ultraviolet absorber is used excessively. In particular, the ultraviolet absorber may be, but not limited to, a benzophenol derivative, BYK 3126, and the like and benzophenol derivatives may be used.

The pinhole preventive may be used at about 0.5 to 1.5 wt %, or particularly at about 0.8 to 1.0 wt % to prevent pinholes on the coating surface after applying the coating composition. In particular, an acrylic polymer may be used as the pinhole preventive. The reaction inhibitor may be used at about 0.5 to 1.5 wt %, or particularly at about 0.9 to 1.3 wt % to regulate curing speed and improve storage stability. However, the possibility of uncured state occurrence may increase due to the delay of curing when the amount of the reaction inhibitor used is excessively. In particular, an alkyl acid based reaction inhibitor may be used as the reaction inhibitor.

In addition, the anti-sagging agent may be used at about 6 to 12 wt %, or at about 9 to 10 wt % to prevent thixotropy of coating and maintain sag performance. However, the smoothness of coating may be reduced when the amount of the anti-sagging agent is used excessively. In particular, an acrylic derivative, a silicone-based anti-sagging agent, or the like may be used as the anti-sagging agent, and an acrylic derivative such as acrylic microbubbles may be used.

Further, the solvent may be used to improve coating workability of coating, and a typical solvent for coating composition may be used as the solvent. In particular, one or more solvents may be selected from a hydrocarbon-based solvent, an ether-based solvent, an ester-based solvent, and an alcohol-based solvent. In another exemplary embodiments, a mixture of such solvents may be used. In particular, the solvent may consist of about 1.7 to 1.9 wt % of a hydrocarbon-based solvent, about 1.0 to 1.2 wt % of an ether-based solvent, about 0.7 to 0.9 wt % of an ester-based solvent, and about 0.9 to 1.1 wt % of an alcohol-based solvent. When the solvent used is too little (e.g., below a predetermined level) or absent, the workability of spray coating may deteriorate due to increase in viscosity of coating; and when the solvent is included excessively, the flowability of coating and coating property may deteriorate due to decrease in viscosity.

The double-layer coating composition according to one exemplary embodiment of the present invention may include the second coating in addition to the first coating composition described above. The second may have similar composition to the first coating but may be distinguished from the first coating by that the content of Al particles, which is less in the second coating than in the first coating. The second coating of the present invention may have about the same content ranges of the first coating described above except the content of Al particles. In other words, the second coating may contain about 45 to 65% by weight of acrylic resin, about 15 to 30 wt % of acid epoxy resin adduct of acrylsiloxane resin, about 1 to 5 wt % of a color pigment for coating of the same color as the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent. In particular, the second coating may include about the same content ranges or weight ratios of the first coating described above except Al particles. Indeed, a double-layer coating may be formed in mutually compatible and uniform layer of two coatings when the compositions of the first coating and the second coating except Al particle are in the same weight ratios.

In an exemplary embodiment, the content of Al particles in the second coating of the present invention may be about 0.01 to 0.08 wt %, about 0.02 to 0.05 wt %, or, particularly, about 0.03 to 0.04 wt % which is less than the content of Al particles in the first coating. Sparkling effect may be reduced when the content of Al particles is less than 0.01 wt %; and the chromaticity may be reduced due to increase in light scattering and thus luxurious appearance may also be reduced overall when the content of Al particle is greater than 0.08 wt %. In particular, the content of Al particles in the second coating may be less than in the first coating and thus the second coating may form a coating film layer for improving chromaticity rather than sparkling effect. According to an exemplary embodiment of present invention, Al particles may be used instead of a pearl pigment, which has been used in the typical coating techniques. In addition, a minimal amount of pearl pigment may be additionally used in the second coating.

Since the second coating according to the present invention may be prepared with the composition containing a resin component, a pigment component, an additive component, a solvent component, and the like in the same ranges as the first coating except the content of Al particles as described above, range of content, limitation and the like of the intended use, function, role, and content of the respective components described in the first coating may be applied to the second coating in the same manner. The coating composition according to an exemplary embodiment of the present invention having double layers of a first coating and a second coating as described above may have improved sparkling effect and chromaticity.

Figure 1:
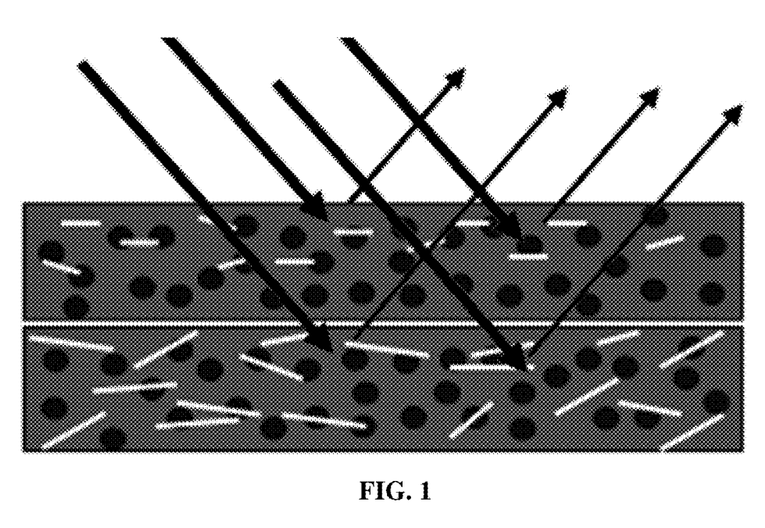
FIG. 1 illustrates an exemplary cross sectional view of the coating composition and the reflection mode of light, according to an exemplary embodiment of the present invention.

In other aspects, a method of applying a double-layer coating to an article according to the present invention may be provided. In an exemplary embodiment, a method may include applying a first coating on an article and applying a second coating thereon, thereby completing a coating process. FIG. 1 schematically illustrates an exemplary coating mode, in which a double-layer coating is applied according an exemplary embodiment of the present invention.

In particular, the present invention may include a method of applying a black coating having an improved sparkling effect which may include applying primary base coating of the first coating composition containing about 45 to 65 wt % of acrylic resin, about 15 to 30 wt % of acid epoxy resin adduct of acrylsiloxane resin, about 1 to 5 wt % of a color pigment for coating, about 0.1 to 1 wt % of Al particle, about 10 to 20 wt % of additive consisting of one or more selected from a surface modifier, a UV absorber, a pinhole preventive, a reaction inhibitor, and an anti-sagging agent, and about 2 to 10 wt % of a solvent; drying of the first coating applied; and secondary coating of the second coating composition containing about 45 to 65 wt % of acrylic resin, about 15 to 30 wt % of an acid epoxy adduct of acrylsiloxane resin, about 1 to 5 wt % of a color pigment for coating the same color as the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent on the dried first coating.

In an exemplary embodiment, the first coating may be generally coated on an article using an automatic spray machine. In addition, the second coating may be applied by the same method after coating the first coating, particularly by a wet on wet method without an intervening drying process before coating the second coating, thereby completing coating. Accordingly, clear coating may be additionally applied to reinforce the physical properties of surface after the second coating. In addition, under coating such as electro deposition or intermediate coat may be applied on the surface of an article before the primary base coating.

In another aspect, the present invention may include a motor vehicle, which may be coated with the double-layer coating according an exemplary embodiment of to the present invention by the coating method described above. In an exemplary embodiment of the present invention, the content of Al particles in the second coating may be less than in the first coating, and thus chromaticity and sparkling effect may be improved substantially and simultaneously when the second coating is applied on the first coating. Therefore, luxurious appearance may be achieved due to a sense of depth and three dimensional effect of coating obtained from applying such a double-layer coating having different Al content in each layer.

In other words, the first coating having a reinforced sparkling effect by containing greater amount of Al particles may be primarily applied on an article and then the second coating may be applied thereon. Thus, chromaticity of such portion where light does not reach or Al particles are not present in the coating layer may be improved. Further, sparkling effect due to the Al particle irradiated with light may be achieved. Since the content of Al particle in the first coating and the second coating are different from each other and the coating composition in the double-layer coating may differentiate coating from each other, the degree of light reflection may be differentiated and thus luxurious coating having an improved illumination in depth or a three dimensional effect may be achieved.

The term "a sense of depth" as used herein may refer a sense of sparkle as shown in a variety of light source, like the starlight in the night sky. Further, differentiated brightness and differentiated sense of reflection may be shown since the three dimensional effect of the sparkling particles, where reflection occurs on the coating film of the second coating and the three dimensional effect passed through the coating film may be separated in layers.

FIG. 1 schematically shows an exemplary coating mode using an exemplary coating composition of the present invention and the light reflection mode. In FIG. 1, the lower part is a primary base coating where the first coating composition is applied and the upper part is a second coating applied thereon; and the black spots represent a black pigment and the long and white lines represent Al particles. In FIG. 1, variety of reflection trajectory may be illustrated.

Figure 2A:
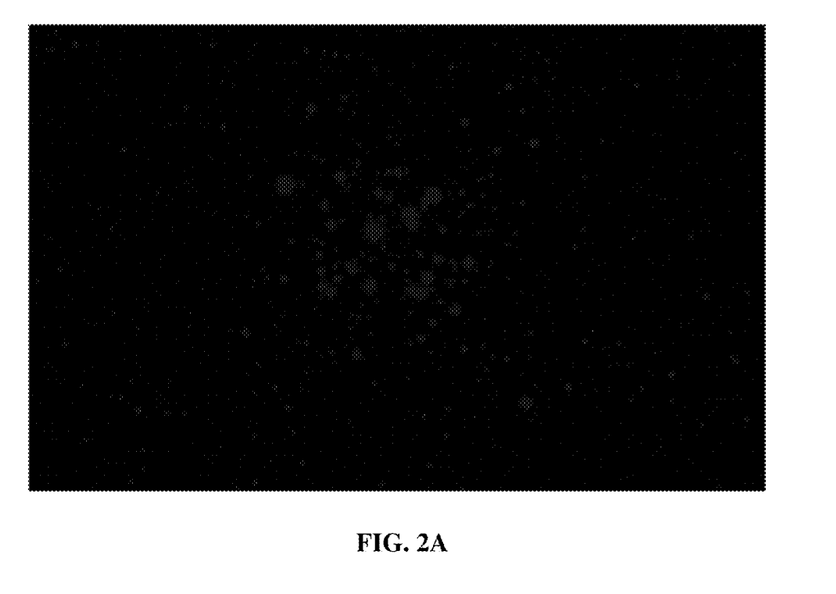
FIGS. 2A-2B show exemplary photographic images of a sparkling effect and chromaticity in comparison of (a) when sun light is not applied and (b) when sun light is applied on the surface of a coated article with the coating composition according to an exemplary embodiment of the present invention.
Figure 2B:
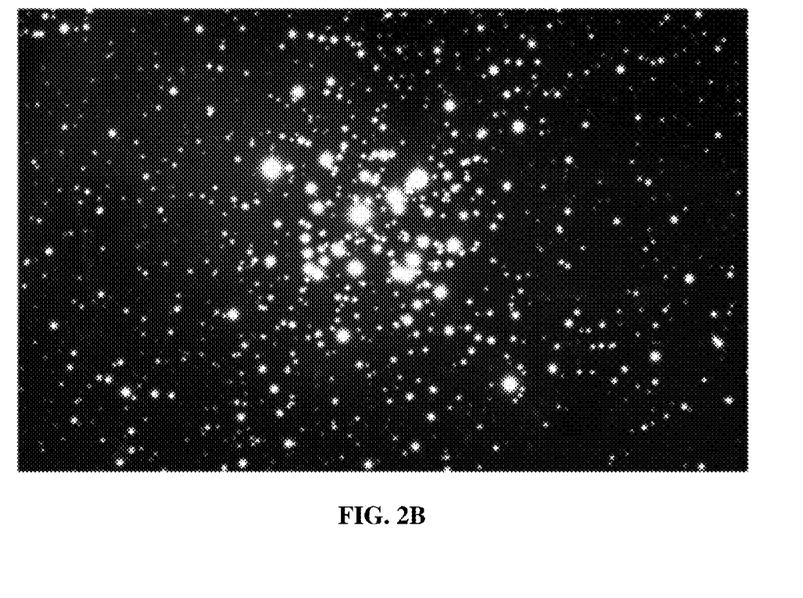
Figure 3:
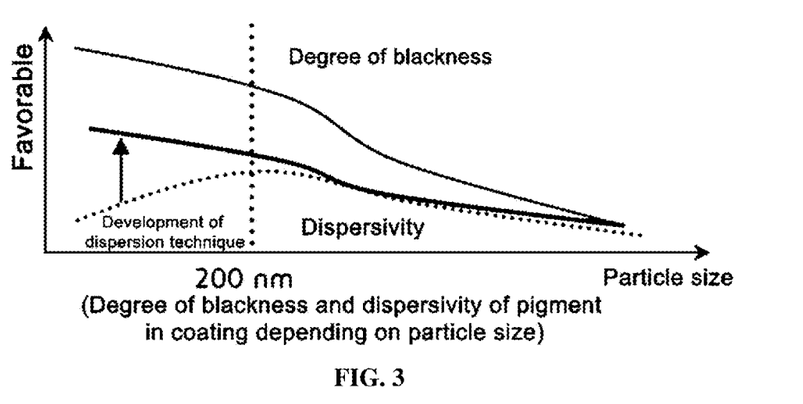
FIG. 3 is an exemplary graph illustrating the changes of dispersivity and degree of blackness depending on the particle size in the coating according to an exemplary embodiment of the present invention. When a black carbon pigment is applied as a pigment, the coating may have improved dispersibility.
Figure 4A:
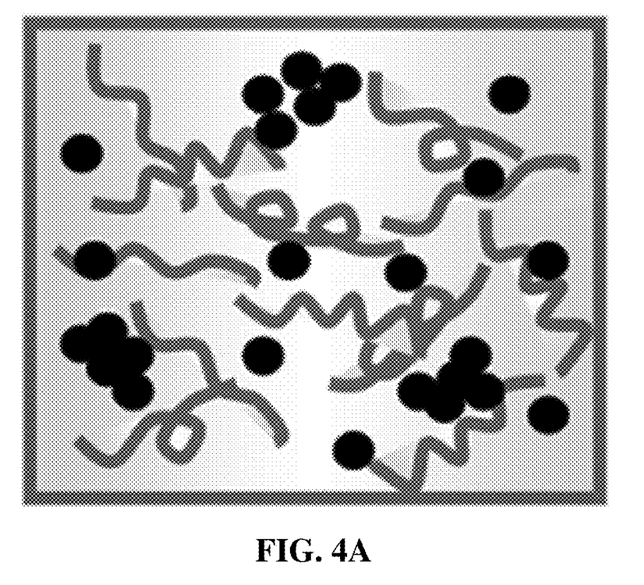
FIGS. 4A-4B show exemplary illustrative views of the substantially uniform pigment dispersion state in a mixed state of a resin component (thread) and a carbon pigment (filled circle) of main components in comparison between (a) a black coating of the related art and (b) of a black coating having improved dispersibility according to an exemplary embodiment of the present invention.
Figure 4B:
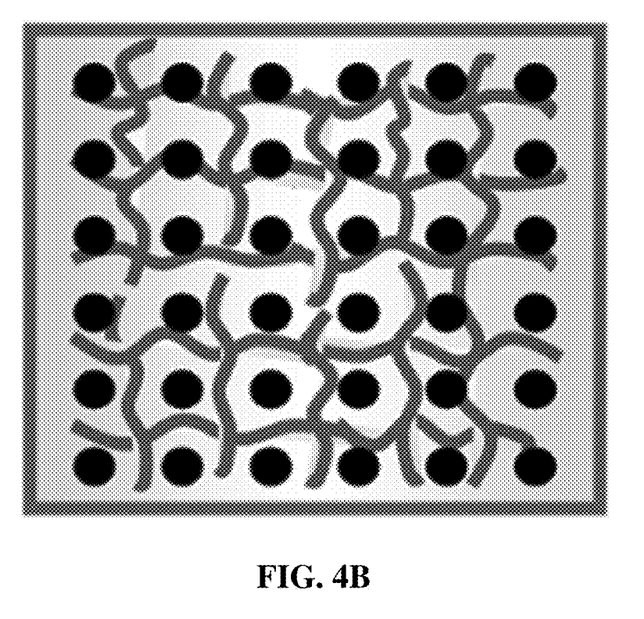

FIGS. 2A-2B show exemplary photographic images in comparison of chromaticity and sparkling effect with respect to (a) a case in which sun light is not applied and (b) a case in which sun light is applied on the surface of a coated article according to an exemplary embodiment of the present invention. In particular, the dispersibility in coating may be improved and chromaticity may be improved significantly when particles of the pigment contained in a coating composition are of a substantially fine size. FIG. 3 is an exemplary graph illustrating dispersivity and degree of blackness according to the particle size in the coating and shows improved dispersibility when a black carbon pigment is used as a pigment according to an exemplary embodiment of the present invention. FIG. 4 shows exemplary illustration of uniform pigment dispersion state in a mixed mode of a resin component and a carbon pigment of main components. In FIG. 4A, a black coating is used as conventional coating; and in FIG. 4B, a black coating having improved dispersibility is used according to an exemplary embodiment of the present invention. In FIGS. 4A-4B, the black spots represent a black pigment and the threadlike shapes represent a coating resin.

Consequently, the coating composition in exemplary embodiments of the present invention may provide excellent physical properties compared to a coating composition of the conventional coating and further be capable of improving chromaticity and sparkling effect significantly and achieving a sense of depth and a three dimensional effect. Therefore, such coating composition in the present invention may be useful for coating a motor vehicle, a home appliance, or the like, of which exterior appearance may an attractive factor to consumers.

The following examples illustrate the invention and are not intended to limit the same.

Example

A first coating was prepared with about 54.2 wt % of acrylic resin, about 21 wt % of acid epoxy resin adduct of acrylsiloxane resin having improved reactivity, about 2.3 wt % of carbon pigment, about 0.3 wt % of Al particles having a size of about 15 to 22 μm, about 2.5 wt % of silicone modified acryl as a surface modifier, about 4 wt % of benzophenol derivative as a UV absorber, about 0.9 wt % of acrylic monomer as a pinhole preventive, about 1.1 wt % of arginine-based reaction inhibitor, about 9 wt % of acrylic derivative as an anti-sagging agent, and about 1.8 wt % of a hydrocarbon-based solvent, about 1.1 wt % of an ether-based solvent, about 0.8 wt % of an ester-based solvent, and about 1.0 wt % of an alcohol-based solvent as solvents.

Separately, a second coating was prepared with about 54.46 wt % of acrylic resin, about 21 wt % of acid epoxy resin adduct of acrylsiloxane resin having improved reactivity, about 2.3 wt % of carbon pigment, about 0.04 wt % of Al particles having a size of about 15 to 22 μm, about 2.5 wt % of silicone modified acryl as a surface modifier, about 4 wt % of benzophenol derivative as a UV absorber, about 0.9 wt % of acrylic monomer as a pinhole preventive, about 1.1 wt % of arginine-based reaction inhibitor, about 9 wt % of acrylic derivative as an anti-sagging agent, and about 1.8 wt % of a hydrocarbon-based solvent, about 1.1 wt % of an ether-based solvent, about 0.8 wt % of an ester-based solvent, and about 1.0 wt % of an alcohol-based solvent as solvents, thereby preparing an exemplary double-layer coating composition.

Comparative Example

A single-layer coating composition was prepared with the same composition of the first coating in Example described above except that the carbon pigment was used at about 2.35 wt %, and a pearl pigment is added at about 0.25 wt % instead of Al particles.

Test Example

The first coating of Example was spray coated on the surface of a motor vehicle door, dried at room temperature for about 1.5 minutes, and then the second coating of Example was spray coated, thereby completing coating. For comparison, the coating composition prepared in Comparative example described above was spray coated two times as coatings from Example described above. Tests on various physical properties shown in the following Table 1 were performed with the coated articles coated with the coating compositions of Example and Comparative example.

| Item | Criteria | Result Comparative example | Example |
|---|---|---|---|
| State in the container | No foreign substance, to be uniformly dispersed at the time of stirring | Favorable | Favorable |
| Dilution | No recognizable precipitation, | Favorable | Favorable |

-continued

| Item | Criteria | Result Comparative example | Example |
|---|---|---|---|
| stability | to be uniformly dispersed at the time of stirring | | |
| Specific gravity | 0.96 or more | 0.98 | 0.98 |
| Non-volatile matter | 43% or more | 46.0% | 46.1% |
| Gloss | High gloss: 88 or more by 20' method | 89 | 88 |
| Quality of exterior surface | Solid: 75/65 or more (horizontal/vertical) | 79/72 | 77/69 |
| Flowability ($\mu$m) | Clear 40 $\mu$m or more | 41 | 41 |
| Smoothing limit ($\mu$m) | Clear 20 $\mu$m or less | 19 | 19 |
| Hardness | B or higher | HB | HB |
| Impact resistance | 20 cm or more by dupont type impactor | 40 cm | 40 cm |
| Adhesion | M-2.5 or more after state/ water proof (40° C.)/ moisture proof (° C.) | M-1.0 | M-1.0 |
| Acid resistance | 37° C. or higher by gradient oven method | 38° C. | 38° C. |
| Scratch resistance | Gloss retention: 55% or more by car wash method | 62.3% | 64.1% |
| Degree of blackness | MA-69 (the higher the better) | 183 | 193 |
| Sparkle | BYK MAC (the higher the better) | 6.32 | 7.78 |
| Chipping resistance | Cold resistance: −30° C., grade 3 or higher | Grade 3 | Grade 3 |
| Salt water spray resistance | One side: 3 mm or less after SST 500 hr | 1 mm | 1 mm |
| Chemical resistance | No abnormality such as discoloration of coating film, swelling, and discoloration | Favorable | Favorable |
| Solvent resistance | 5 minutes or longer in xylene | Favorable | Favorable |

As shown in Table 1 above, the coating composition of Example may exhibit a superior degree of blackness and sparkling effect compared to the coating composition of Comparative example. In other words, Example exhibits 10 point higher in the degree of blackness and 1.5 point higher in sparkling effect than those of Comparative example. Thus, the present invention may provide the coating composition to improve the degree of blackness and sparkling effect to a great extent compared to those of Comparative example, in which a conventional coating composition is applied.

According to exemplary embodiments of the present invention, a double-layer coating composition including a first coating and a second coating, in which the content of Al particle is different from each other, may provide improved and simultaneous chromaticity and sparkling effect over conventional techniques with coating composition using a pearl pigment or a coating composition using consistent content of a metal component, such as Al. Therefore, the double-layered coating composition including the first coating and the second coating according to one exemplary embodiment of the present invention may be applied to an electrical and electronic product, a motor vehicle, and the like, in which exterior appearance is an important factor to customers. Particularly, the coating composition of the present invention may be significantly useful to a home appliance or a motor vehicle, and be widely used for such products.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A double-layer coating composition having an improved sparkling effect, comprising:
a first coating that includes about 45 to 65 wt % of acrylic resin, about 15 to 30 wt % of acid epoxy resin adduct of acrylsiloxane resin, about 1 to 5 wt % of a color pigment, about 0.1 to 1 wt % of aluminum (Al) particle, about 10 to 20 wt % of at least one additive selected from a surface modifier, an ultraviolet (UV) absorber, a pinhole preventive, a reaction inhibitor, and an anti-sagging agent, and about 2 to 10 wt % of a solvent; and
a second coating that includes about 45 to 65 wt % of acrylic resin, about 15 to 30 wt % of acid epoxy resin adduct of acrylsiloxane resin, about 1 to 5 wt % of the color pigment used in the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent.

2. The coating composition of claim 1, wherein the color pigment is a carbon pigment.

3. The coating composition of claim 1, wherein the Al particle has a size of about 15 to 25 $\mu$m.

4. The coating composition of claim 1, wherein the additive contains about 1 to 5 wt % of the surface modifier, about 2 to 7 wt % the UV absorber, about 0.5 to 1.5 wt % of the pinhole preventive, about 0.5 to 1.5 wt % of the reaction inhibitor, and about 6 to 12 wt % of the anti-sagging agent.

5. The coating composition of claim 1, wherein the solvent contains one or more selected from a group consisting of: a hydrocarbon-based solvent, an ether-based solvent, an ester-based solvent, and an alcohol-based solvent.

6. The coating composition of claim 5, wherein the solvent contains about 1.7 to 1.9 wt % of the hydrocarbon-based solvent, about 1.0 to 1.2 wt % of the ether-based solvent, about 0.7 to 0.9 wt % of the ester-based solvent, and about 0.9 to 1.1 wt % of the alcohol-based solvent.

7. The coating composition of claim 1, wherein the first coating includes:
about 50 to 60 wt % of acrylic resin, about 18 to 25 wt % of acrylsiloxane resin;
about 2.0 to 2.5 wt % of the color pigment;
about 0.2 to 0.5 wt % of Al particle;
as the additive, about 1 to 5 wt % of the surface modifier, about 2 to 7 wt % the UV absorber, about 0.5 to 1.5 wt % of the pinhole preventive, about 0.5 to 1.5 wt % of the reaction inhibitor, and about 6 to 12 wt % of the anti-sagging agent; and
as the solvent, about 1.7 to 1.9 wt % of the hydrocarbon-based solvent, about 1.0 to 1.2 wt % of the ether-based solvent, about 0.7 to 0.9 wt % of the ester-based solvent, and about 0.9 to 1.1 wt % of the alcohol-based solvent.

8. The coating composition of claim 1, wherein the second coating includes:
about 50 to 60 wt % of acrylic resin;
about 18 to 25 wt % of acrylsiloxane resin;
about 2.0 to 2.5 wt % of the color pigment;

about 0.02 to 0.05 wt % of Al particle;
as the additive, about 1 to 5 wt % of the surface modifier, about 2 to 7 wt % the UV absorber, about 0.5 to 1.5 wt % of the pinhole preventive, about 0.5 to 1.5 wt % of the reaction inhibitor, and about 6 to 12 wt % of the anti-sagging agent; and
as the solvent, about 1.7 to 1.9 wt % of the hydrocarbon-based solvent, about 1.0 to 1.2 wt % of the ether-based solvent, about 0.7 to 0.9 wt % of the ester-based solvent, and about 0.9 to 1.1 wt % of the alcohol-based solvent.

9. A method of double-layer coating, comprising:
applying a first coating composition, including about 45 to 65 wt % of acrylic resin, about 15 to 30 wt % of acid epoxy resin adduct of acrylsiloxane resin, about 1 to 5 wt % of a color pigment for coating, about 0.1 to 1 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent; and
secondary coating by applying a second coating composition, including about 45 to 65 wt % of acrylic resin, about 15 to 30 wt % of acid epoxy resin adduct of acrylsiloxane resin, about 1 to 5 wt % of the color pigment used in the first coating, about 0.01 to 0.08 wt % of Al particle, about 10 to 20 wt % of at least one additive selected from a surface modifier, a UV absorber, a pinhole preventive, a reaction inhibitor, and an anti-sagging agent, and about 2 to 10 wt % of a solvent.

10. The coating method of claim 9, wherein the method further includes:
drying the first coating by a wet on wet method after the first coating process, and before the second coating process.

11. A motor vehicle coated with the double-layer coating composition of claim 1, wherein the first coating is applied on a surface of the motor vehicle and then the second coating is applied on the first coating.

* * * * *